United States Patent
Wright et al.

(10) Patent No.: US 9,824,499 B2
(45) Date of Patent: Nov. 21, 2017

(54) MIXED-REALITY IMAGE CAPTURE

(71) Applicant: MICROSOFT TECHNOLOGY LICENSING, LLC, Redmond, WA (US)

(72) Inventors: Shawn Crispin Wright, Sammamish, WA (US); Dan Osborn, Woodinville, WA (US); Alberto E. Cerriteno, Bothell, WA (US); Bofan Hsu, Bothell, WA (US); Evan Jones, Kirkland, WA (US); Joe Thompson, Seattle, WA (US); Forest Woodcroft Gouin, Seattle, WA (US); Megan Saunders, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 64 days.

(21) Appl. No.: 14/747,997

(22) Filed: Jun. 23, 2015

(65) Prior Publication Data
US 2016/0379408 A1   Dec. 29, 2016

(51) Int. Cl.
*G09G 5/00* (2006.01)
*G06T 19/00* (2011.01)
(Continued)

(52) U.S. Cl.
CPC ........ *G06T 19/006* (2013.01); *G02B 27/0093* (2013.01); *G02B 27/0172* (2013.01);
(Continued)

(58) Field of Classification Search
None
See application file for complete search history.

(56) References Cited

U.S. PATENT DOCUMENTS 5,495,576 A    2/1996  Ritchey
2012/0120103 A1*  5/2012  Border ................ G02B 27/017
                                              345/633
(Continued)

FOREIGN PATENT DOCUMENTS

WO    2014107629 A1    7/2014

OTHER PUBLICATIONS

Bove Jr., V. Michael, "Display Holography's Digital Second Act", In Proceedings of the IEEE, vol. 100, No. 4, Apr. 2012, pp. 918-928.
(Continued)

*Primary Examiner* — Martin Mushambo
(74) *Attorney, Agent, or Firm* — Alleman Hall Creasman & Tuttle LLP

(57) ABSTRACT

A head-mounted display includes a visible-light camera configured to collect a visible-light image of a physical space, a surface sensor configured to measure one or more surface parameters of the physical space, a see-through display configured to visually present an augmentation image while light from the physical space passes through the see-through display to a user eye, and an augmented-reality engine. The augmented-reality engine may be configured to identify a surface of the physical space from the one or more measured surface parameters, compose a mixed-reality image that includes the augmentation image overlaid on the visible-light image, and visually present, via the see-through display, the mixed-reality image in alignment with the identified surface.

17 Claims, 9 Drawing Sheets

(51) Int. Cl.
  *G02B 27/01* (2006.01)
  *G02B 27/00* (2006.01)
(52) U.S. Cl.
  CPC ............... *G02B 2027/0174* (2013.01); *G02B 2027/0198* (2013.01)

(56) References Cited

U.S. PATENT DOCUMENTS

| | | | | |
|---|---|---|---|---|
| 2013/0050432 | A1* | 2/2013 | Perez | H04N 13/0278 348/47 |
| 2013/0083003 | A1* | 4/2013 | Perez | G06F 3/005 345/419 |
| 2013/0095924 | A1 | 4/2013 | Geisner et al. | |
| 2013/0169683 | A1* | 7/2013 | Perez | G02B 27/02 345/633 |
| 2013/0293577 | A1* | 11/2013 | Perez | G02B 27/017 345/633 |
| 2013/0326364 | A1* | 12/2013 | Latta | G06F 3/012 715/751 |
| 2014/0002444 | A1 | 1/2014 | Bennett et al. | |
| 2014/0160001 | A1 | 6/2014 | Kinnebrew et al. | |
| 2014/0192084 | A1* | 7/2014 | Latta | G06F 21/10 345/633 |

OTHER PUBLICATIONS

Crecente, Brian, "Microsoft's Hologram Glasses Change the Way You See the World", Published on: Jan. 21, 2015 Available at: http://www.polygon.com/2015/1/21/7869631/microsofts-hologram-glasses-changes-the-way-you-see-the-world.

"Mixed Reality Interaction 2014/2015", Retrieved on: Mar. 23, 2015 Available at: https://jensgrubert.wordpress.com/teaching-and-supervision/mixed-reality-interaction-20142015/.

Wakunami, et al., "Hologram Calculation for Deep 3D Scene from Multi-View Images", In Proceedings of 8th International Conference on Virtual Reality Continuum and its Applications in Industry, Dec. 14, 2009, pp. 277-278.

Saggio, et al., "New Trends in Virtual Reality Visualization of 3D Scenarios", In Proceedings of Virtual Reality—Human Computer Interaction, Sep. 5, 2012, pp. 3-20.

Boyd, John, "Trying Out Canon's Mixed-Reality Tech", Published on: Jul. 26, 2012 Available at: http://spectrum.ieee.org/consumer-electronics/gadgets/trying-out-canons-mixedreality-tech.

Hara, et al., "Mixed Reality Mirror Display", In Proceedings of SIGGRAPH Asia Emerging Technologies, Nov. 28, 2012, 3 pages.

Madison, Greg, "The Future of Augmented Reality and Virtual Reality: Alternative Reality", Published on: Jan. 15, 2014 Available at: http://www.gregmadison.fr/2014/01/the-future-of-augmented-reality-and.html.

* cited by examiner

MIXED-REALITY IMAGE CAPTURE

BACKGROUND

A display device may be configured to display augmented-reality images to provide the illusion that augmented-reality objects, sometimes referred to as holograms, are present in the surrounding real-world environment from a perspective of a user of the display device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display includes a visible-light camera configured to collect a visible-light image of a physical space, a surface sensor configured to measure one or more surface parameters of the physical space, a see-through display configured to visually present an augmentation image while light from the physical space passes through the see-through display to a user eye, and an augmented-reality engine. The augmented-reality engine is configured to identify a surface of the physical space from the one or more measured surface parameters, compose a mixed-reality image that includes the augmentation image overlaid on the visible-light image, and visually present, via the see-through display, the mixed-reality image in alignment with the identified surface.

DETAILED DESCRIPTION

The present disclosure is directed to an approach for controlling an augmented-reality device to take a visible-light image of a physical space using an on-board camera. Further, the visible-light image may be automatically converted into a hologram that is visually presented, via a display of the augmented-reality device, in alignment with an identified surface of the physical space. For example, the hologram may appear to hang on a wall of the physical space from a perspective of the user of the augmented-reality device.

More particularly, in some implementations, an augmentation image may be visually presented, via the display of the augmented-reality device. The augmentation image may include a hologram seemingly intermixed with real-world objects in the physical space from a perspective of the user of the augmented-reality device. Further, a mixed-reality image may be composed that includes the augmentation image overlaid on the visible-light image. The mixed-reality image may be automatically visually presented, via the display, in alignment with an identified surface of the physical space.

Figure 1:
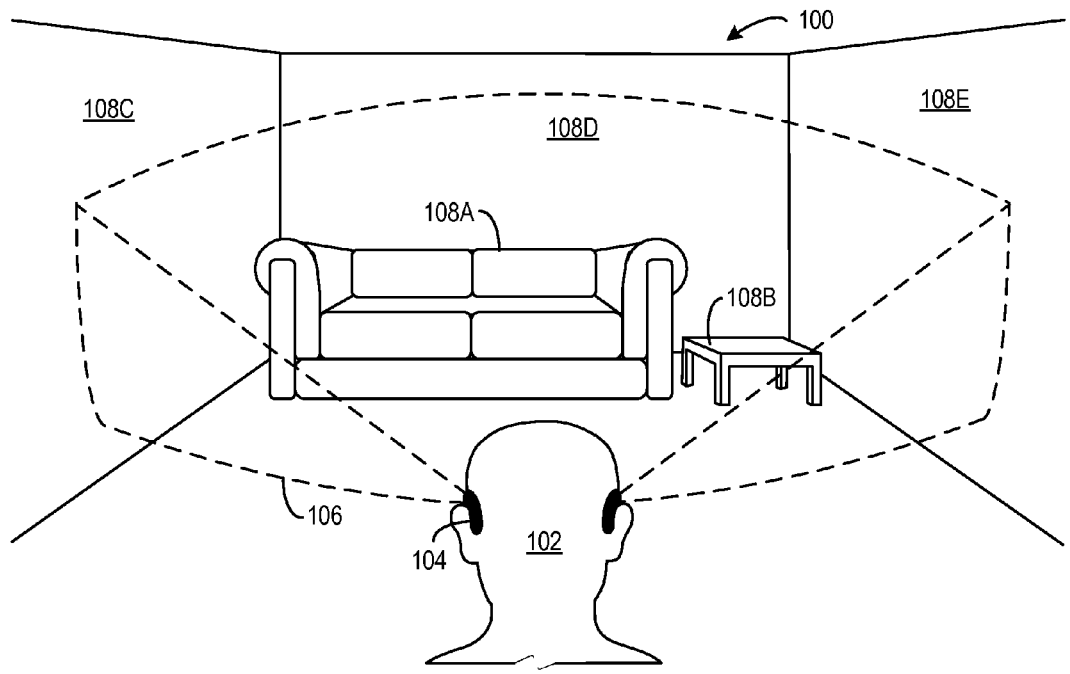
FIG. 1 shows an example physical space including a user wearing a head-mounted, see-through display device.

FIG. 1 shows an example physical space 100 in which a user 102 is wearing an augmented-reality device in the form of a head-mounted, see-through display device (referred to herein as a head-mounted display (HMD)) 104. The HMD 104 provides the user 102 with a see-through field of view (FOV) 106 of the physical space 100. Because the HMD 104 is mounted on the user's head, the FOV 106 of the physical space 100 may change as a pose of the user's head changes.

The physical space 100 may include a plurality of real-world objects 108 (e.g., 108A, 108B, 108C, 108D, 108E) that may be visible to the user 102 within the FOV 106 of the HMD 104. Furthermore, the plurality of real-world objects 108 may be visible to other users in the physical space 100 that are not using an augmented-reality device to view the physical space 100.

The HMD 104 may be configured to visually present augmented-reality images to the user 102 in the FOV 106 of the HMD 104. These augmented-reality images may be displayed by display componentry of the HMD 104. As such, display light of the HMD may be directed to a user eye so that the user will see augmented-reality images that are not actually present in the physical space. In see-through display implementations, such display light may be directed to the user eye while light from the physical space 100 passes through the HMD 104 to a user eye. As such, the user eye simultaneously receives light from the physical environment (e.g., light reflecting from couch 108A) and light from the display.

Figure 2:
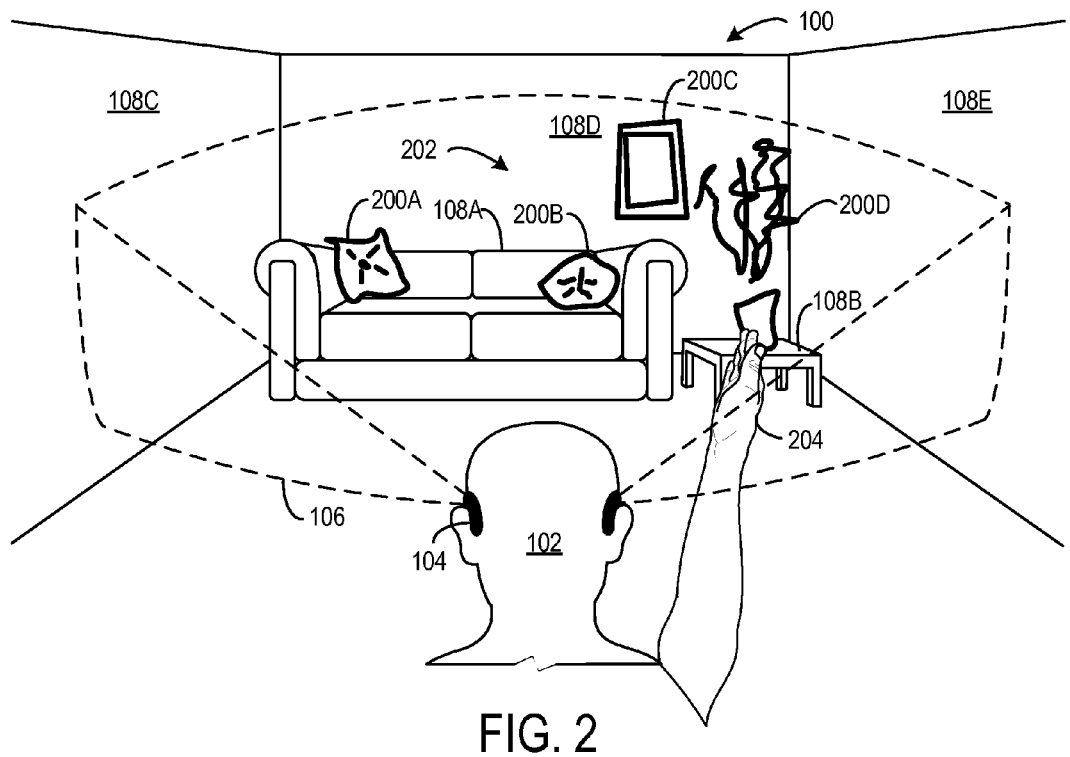
FIG. 2 shows an example scenario where the see-through display device of FIG. 1 is augmenting the physical space by creating an augmentation image visually presented to the user.

In FIG. 2, the HMD 104 visually presents a plurality of augmented-reality objects 200 (e.g., 200A, 200B, 200C, 200D) that collectively form an augmentation image 202. In particular, a first virtual pillow 200A and a second virtual pillow 200B appear to be located on a real-world couch 108A, a virtual picture 200C appears to be hanging on a real-world wall 108D, and a virtual flower arrangement 200D appears to be located on a real-world end table 108B.

Note that the plurality of augmented-reality objects 200 only may be seen by the user 102 via the HMD 104. In other words, the plurality of augmented-reality objects 200 may not be visible to other users in the physical space 100 because light from the display does not reach their eyes.

In the illustrated example, the user 102 is creating the augmentation image 202 via gesture input. For example, the user 102 may virtually draw the plurality of augmented-reality objects 200 using a pointed hand/finger 204 as a virtual pen. The plurality of augmented-reality objects 200 may be virtually drawn using any suitable gestures, audio commands, other natural user input, or a combination thereof. In some examples, the plurality of augmented-reality objects 200 may be created without gesture input (e.g., using a painting application on a computing device separate from the HMD 104 to create the augmentation image 202). In such an example, the augmentation image may be sent to the HMD 104 and the HMD 104 may be visually present the augmentation image 202. In some cases, the HMD 104 may visually present a predefined augmentation image, and the user may further augment the augmentation image by virtually drawing additional augmentation objects via gesture input to customize the augmentation image. In some implementations, augmentation objects may be user interface elements from augmented-reality applications, game objects from augmented-reality games, and/or holograms of remote communication participants. In general, augmentation objects of any type may be displayed without departing from the scope of this disclosure.

The HMD 104 may be configured to visually present augmented-reality images such that perceived augmented-reality objects are body-locked and/or world-locked. A body-locked augmented-reality object may appear to move with a perspective of the user 102 as a pose (e.g., 6DOF: x, y, z, yaw, pitch, roll) of the HMD 104 changes. As such, a body-locked, augmented-reality object may appear to occupy the same portion of the FOV 106 and may appear to be at the same distance from the user 102, even as the user 102 moves in the physical space 100.

On the other hand, a world-locked, augmented-reality object may appear to remain in a fixed location in the physical space 100, even as the pose of the HMD 104 and the perspective of the user 102 changes. For example, the plurality of augmented-reality objects 200 may be world-locked, augmented-reality objects that appear to be located at fixed real-world locations regardless of a perspective from which the user 102 views the plurality of augmented-reality objects 200. To support a world-locked, augmented-reality object, in one example, the HMD 104 may be configured to track a 6DOF pose of the HMD 104 and a geometric mapping/modeling of surface aspects of the physical space 100. Such tracking and mapping will be discussed in further detail below with reference to FIG. 15.

As discussed above, in some cases, the user 102 may desire to visualize and/or save the augmentation image 202 overlaid on a visible-light image of the physical space 100 in the form of a mixed-reality image. The user 102 may visualize the mixed-reality image in alignment with a surface of the physical space 100 or at another location. For example, the user 102 may immediately visualize what the mixed-reality image would look like hanging on a wall of the physical space 100.

Figure 3:
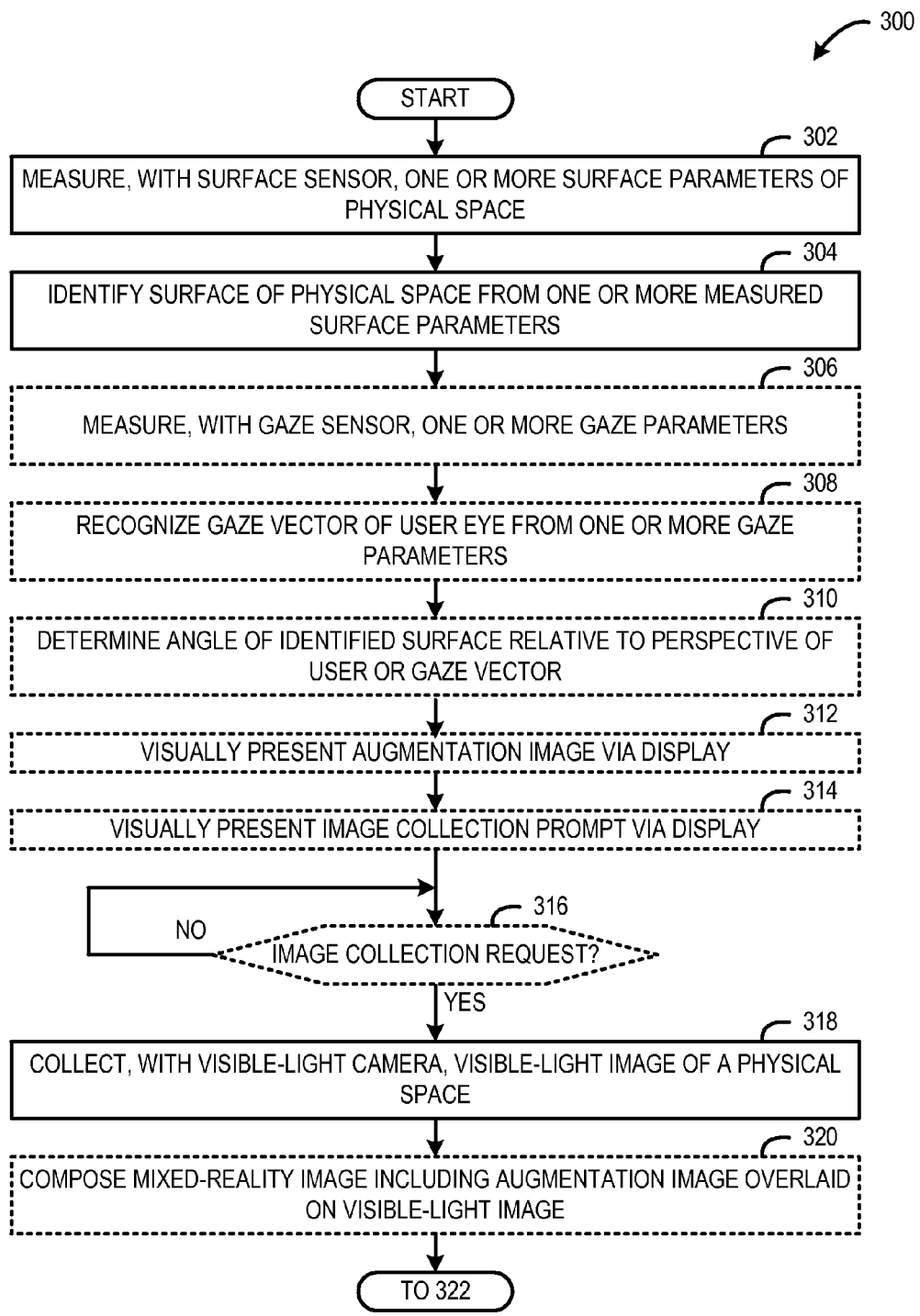
FIGS. 3-4 show an example method for controlling the see-through display device of FIG. 1.
Figure 4:
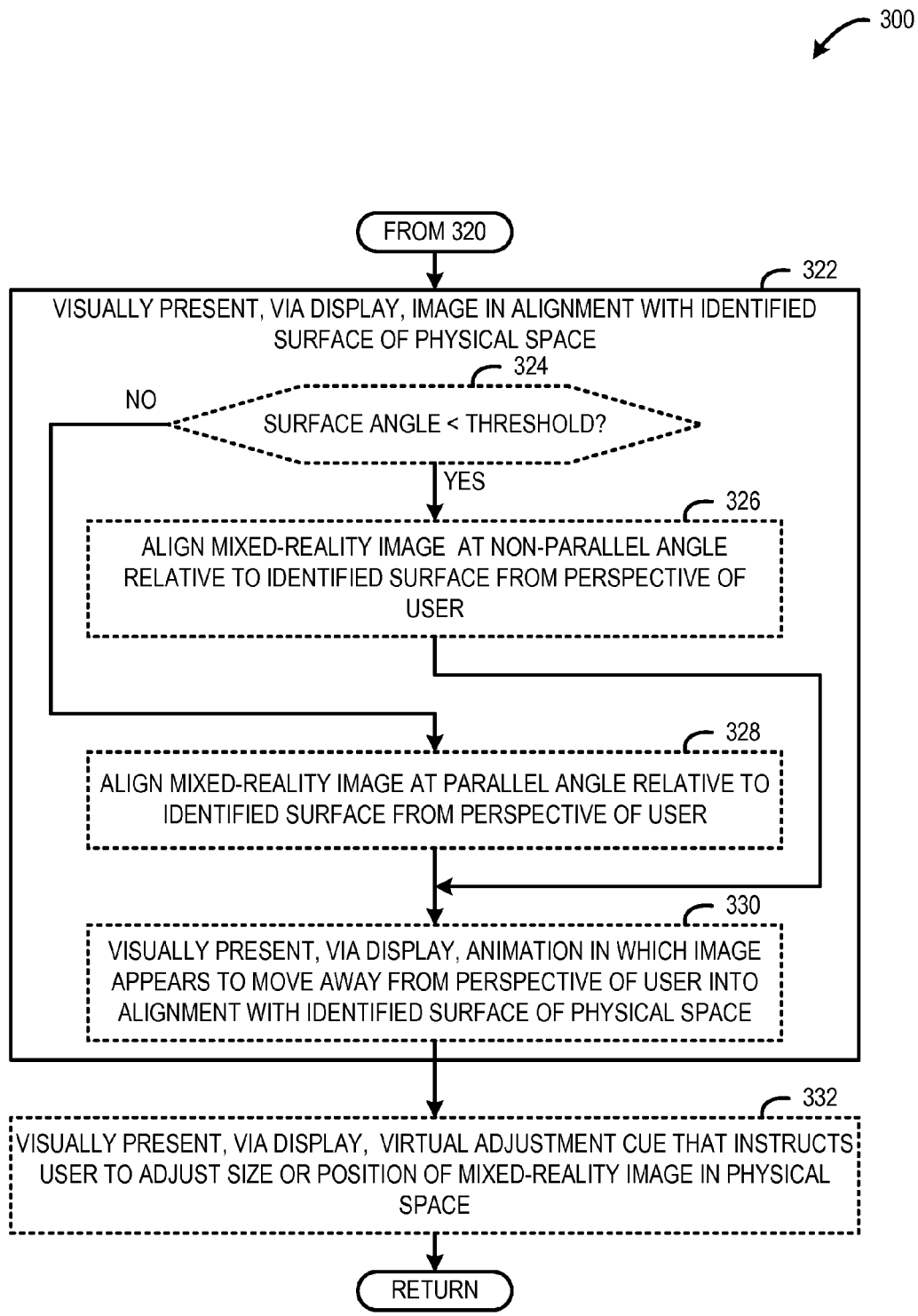

FIGS. 3-4 show an example method 300 for controlling an augmented-reality device to visually present a mixed-reality image. In one example, the method 300 is performed by the HMD 104 shown in FIG. 1. In another example, the method 300 is performed by an HMD 1500 shown in FIG. 15. More particularly, in one example, the method 300 is performed by an augmented-reality engine 1520 of the HMD 1500. In another example, the method 300 is performed by a computing system 1600 shown in FIG. 16. In general, the method 300 may be performed by any suitable augmented-reality engine and/or display.

FIGS. 5-14 shows various operations that may be performed by the HMD 104 in the course of performing the method 300, and will be referenced throughout discussion of the method 300.

At 302, the method 300 may include measuring, with a surface sensor of the augmented-reality device, one or more surface parameters of the physical space. A surface parameter may be any suitable parameter that can be used to identify a surface in the physical space. In one example, the surface sensor includes one or more depth cameras positioned on the augmented-reality device to collect depth images of the physical space, and the one or more surface parameters may include relative surface depths measured by the one or more depth cameras. In other words, the one or more depth cameras may create a depth map of the environment that details a relative depth for each pixel of the depth map. Any suitable type of surface sensor may be employed to measure a surface parameter of the physical space.

At 304, the method 300 may include identifying one or more surfaces of the physical space from the one or more measured surface parameters. A surface may be identified based on any suitable surface parameter in any suitable manner. In one example where depth maps are produced from a depth camera, an on-board or off-board computing system may analyze the depth map to identify substantially flat expanses as judged by the relative depths of neighboring depth pixels. One or more surface criteria may be used to determine what will qualify as a surface. For example, while everything in the physical space technically has a surface, the augmented reality device may only consider substantially flat surfaces of a threshold size for purposes of this mixed-reality imaging application. As such, one or more parameters (e.g., flatness, size, orientation, and/or texture) may be used to identify surfaces. In some examples, a plurality of surfaces (e.g., all surfaces) in the physical space may be identified.

In some implementations, at 306, the method 300 optionally may include measuring, with a gaze sensor of the augmented-reality device, one or more gaze parameters. A gaze parameter may be any suitable parameter that can be used to identify a gaze vector of a user eye or an augmented reality device. In one example, the gaze sensor includes one or more light sources (e.g., infrared light sources), and one or more image sensors positioned on the augmented-reality device to collect images of a user eye.

In some implementations, at 308, the method 300 optionally may include recognizing a gaze vector from the one or more gaze parameters. A gaze vector may indicate a direction, depth, and/or position at which a user eye is gazing and/or a direction and/or position an augmented reality device is facing. A gaze vector may be identified based on any suitable gaze parameter in any suitable manner. In one example, infrared light sources may be configured to cause a glint of light to reflect from a cornea of each eye of the user, and the glints may be captured in images of the user's eyes. The image may be analyzed to determine an optical axis of each eye based on a position of the glint relative to a pupil of that eye. Further, the gaze vector may be determined relative to the optical axis.

Figure 5:
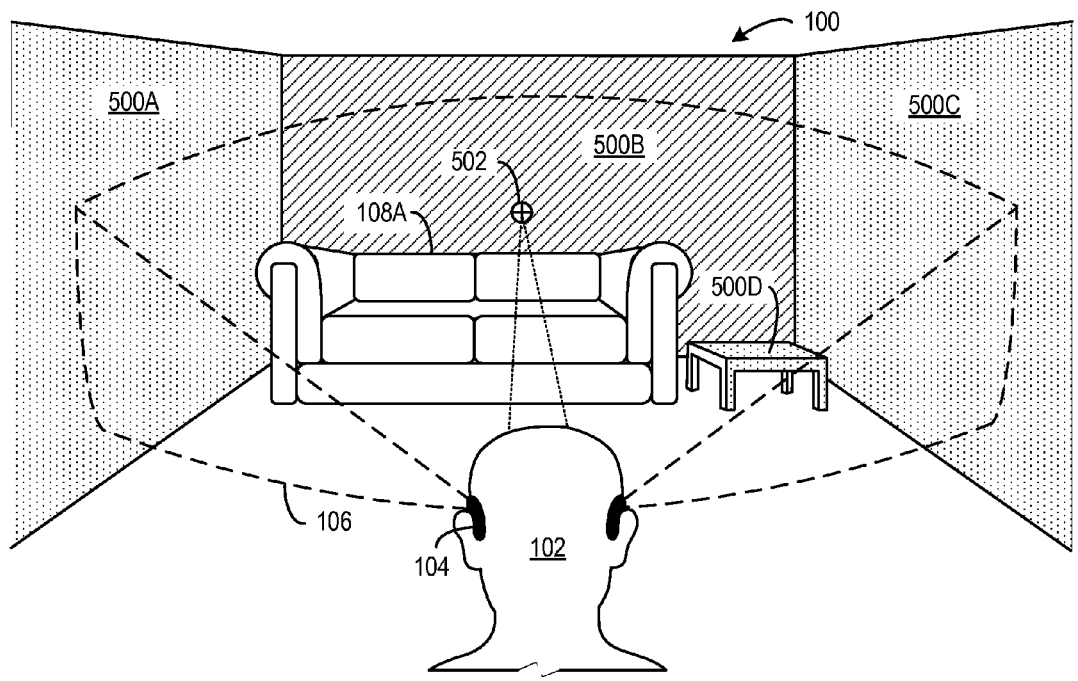
FIG. 5 shows an example scenario in which the see-through display device of FIG. 1 identifies surfaces of the physical space.

In FIG. 5, the HMD 104 may identify a plurality of surfaces 500 (e.g., 500A, 500B, 500C, 500D) of the physical space 100. The plurality of identified surfaces 500 are indicated by dotted or dashed lines. The plurality of identified surfaces 500 include walls of the physical space 100, as well surfaces of objects in the physical space 100. In this example, surfaces of the couch 108A may not be identified by the HMD 104, because the contours of the couch do not satisfy surface criteria currently used to identify surfaces. In another example, the HMD 104 may identify the surfaces of the couch 108A, because more lenient flatness and/or size criteria may be in effect.

Furthermore, the HMD 104 may recognize a gaze vector 502 of the user 102. Based on a position of the gaze vector 502, the HMD 104 may recognize that a wall 500B is nearest the gaze vector 502. In some implementations, a mixed-reality image visually presented by the HMD 104 may be aligned with the surface 500B nearest the gaze vector 502.

In some implementations, the gaze vector 502 may not be determined based on a position of the user's eyes. Instead, the gaze vector 502 may be predefined relative to a pose of the HMD 104. In such implementations, the gaze vector 502 may change responsive to a change in orientation of the HMD 104. In other words, in such implementations, the user can look around without moving his head, and the gaze vector 502 would not change.

Continuing with FIG. 3, in some implementations, at 310, the method 300 optionally may include determining an angle (referred to as a surface angle) of the identified surface relative to a perspective of the user eye or the gaze vector. The angle of the identified surface may be determined in any suitable manner. In one example, the surface angle may be measured between the plane of the surface and a ray aligned with the gaze vector and extending from the surface to the perspective of the user (or the augmented-reality device).

In some implementations, at 312, the method 300 optionally may include visually presenting, on a display of the augmented-reality device, an augmentation image. In one example, the augmented-reality device may include a see-through display and the augmentation image may be visually presented via the see-through display while light from the physical space passes through the see-through display to a user eye.

In FIG. 2, the HMD 104 visually presents the augmentation image 202 in the FOV 106. In particular, the augmentation image 202 includes the plurality of augmented-reality objects 200 seemingly intermixed with the physical space 100.

Continuing with FIG. 3, in some implementations, at 314, the method 300 optionally may include visually presenting, via the display of the augmented-reality device, an image collection prompt. The image collection prompt may visually instruct a user how/when it is suitable to take a picture of the physical space. The image collection prompt may be visually presented responsive to any suitable condition, event, operation, mode, or user action. As examples, the image collection prompt may be presented responsive to voice command, gesture command, eye command, button/control activation, and/or situational context.

Figure 6:
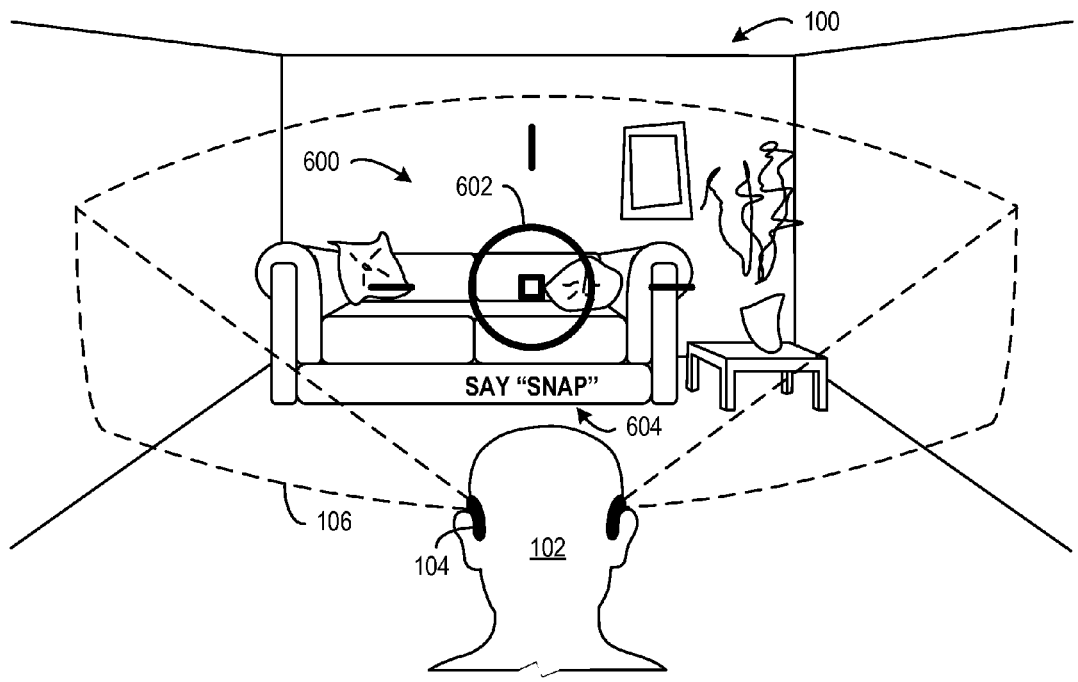
FIG. 6 shows an example mixed-reality image collection prompt visually presented via the see-through display device of FIG. 1.

In FIG. 6, the HMD 104 visually presents an image collection prompt 600. In particular, the image collection prompt 600 includes a targeting reticle 602 and an image collection instruction 604. The targeting reticle 602 may act as a reference for the user 102 to aim the HMD 104 to collect the image of the physical space 100 (with or without virtual augmentation). The targeting reticle 602 may take any suitable form or may be omitted altogether.

The image collection instruction 604 may instruct the user 102 how to properly trigger collection of the image of the physical space 100. In the illustrated example, the image collection instruction 604 instructs the user 102 to say the term "SNAP" to trigger image collection of the physical space 100. The image collection instruction 604 may instruct the user to perform any suitable action to trigger image collection. For example, a user may say a term, perform a gesture, press a button, or carry out an operation to trigger the HMD 104 to collect a visible-light image of the physical space 100. In some implementations, the image collection instruction may be omitted, or the image collection instruction may be omitted after the user has completed a threshold number of image collections.

Continuing with FIG. 3, in some implementations, at 316, the method 300 optionally may include determining whether an image collection request has been made. In some examples, the image collection request may be a user request that is initiated by a user action (e.g., saying a term, performing a gesture). In some examples, the image collection request may be a request made by the augmented-reality device. In other words, the augmented-reality device may automatically collect a visible-light image based on various operating conditions of the augmented-reality device. For example, the augmented-reality device may automatically collect a visible-light image responsive to occurrence of a trigger event without intervention by the user. If an image collection request has been made, then the method 300 moves to 318. Otherwise, the method 300 returns to 316.

At 318, the method 300 may include collecting, with a visible-light camera of the augmented-reality device, a visible-light image of the physical space. In one example, the visible-light camera may be an outward facing camera that is positioned on the HMD 104 to collect a visible-light image that is at least partially aligned with the FOV 106 of the HMD 104.

In some implementations, at 320, the method 300 optionally may include composing a mixed-reality image that includes the augmentation image overlaid on the visible-light image. For example, the augmentation image may be aligned with the visible-light image such that the mixed-reality image recreates the augmented reality perspective of the user when the visible light image was collected.

Composing a mixed-reality image may be optional based on whether or not the augmented-reality device augmented the physical space with an augmentation image. If no augmentation image exists, and the user is merely visually presented with a view of the physical space that is not virtually augmented, then a mixed-reality image may not be composed (or equivalently, the mixed-reality image may not include any augmentations). Otherwise, if an augmentation image is visually presented via the display of the augmented-reality device, then a mixed-reality image including augmentations may be composed.

In FIG. 4, at 322, the method 300 may include visually presenting, via the display of the augmented-reality device, an image in alignment with the identified surface of the physical space. If the physical space is virtually augmented via the display of the augmented-reality device prior to collection of the visible-light image, then the image included in the animation may be a mixed-reality image. If the physical space is not virtually augmented via the display of the augmented-reality device prior to collection of the visible-light image, then the image included in the animation may be a visible-light image. In some implementations, a visible light image without augmentations may be presented even if augmentations were being displayed when the visible light image was captured.

Figure 7:
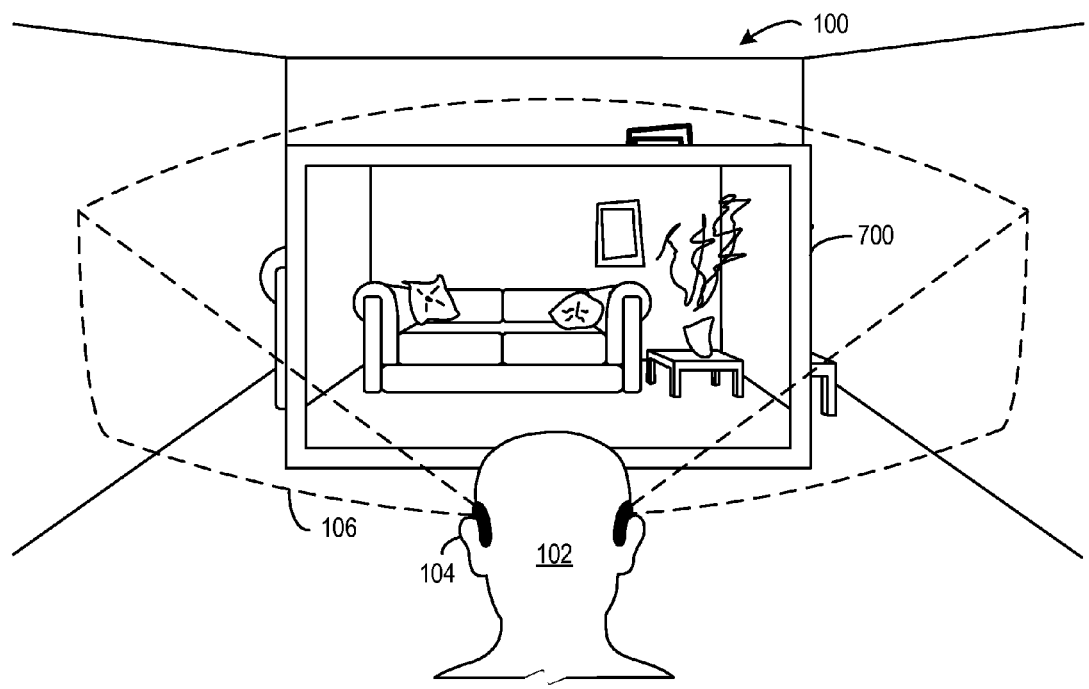
FIG. 7 shows the see-through display device of FIG. 1 visually presenting an example mixed-reality image of the physical space.

In FIG. 7, the HMD 104 visually presents a mixed-reality image 700 that is a composition of the augmentation image 202 shown in FIG. 2 overlaid on a visible-light image of the physical space 100. The mixed-reality image 700 may have any suitable size when the mixed-reality image 700 is initially visually presented to the user 102. In one example, the mixed-reality image 700 may be initially sized to substantially fill the FOV 106 of the HMD 104.

In some implementations, the HMD 104 may be configured to automatically visually present the mixed-reality image 700 responsive to a user request during use of the HMD 104. For example, the user request may include the user saying a selected term, performing a gesture, pressing a button on the HMD 104, or carrying out another operation.

In some implementations, the HMD 104 may be configured to automatically visually present the mixed-reality image 700 responsive to the visible-light camera collecting the visible light image.

In some implementations, the mixed-reality image 700 may be automatically saved to an on-board or off-board designated storage location responsive to the mixed-reality image 700 being composed and visually presented. In one example, the mixed-reality image 700 may be automatically stored in a cloud storage location associated with the user 102 and/or the HMD 104.

In some implementations, the mixed-reality image may be stored with a location tag that indicates a real-world position of the physical space 100 augmented by the mixed-reality image 700. The location tag may allow the mixed-reality image 700 to be visually presented at the same position in the physical space 100 at a time after the mixed-reality image 700 is initially visually presented by the HMD 104.

Figure 8:
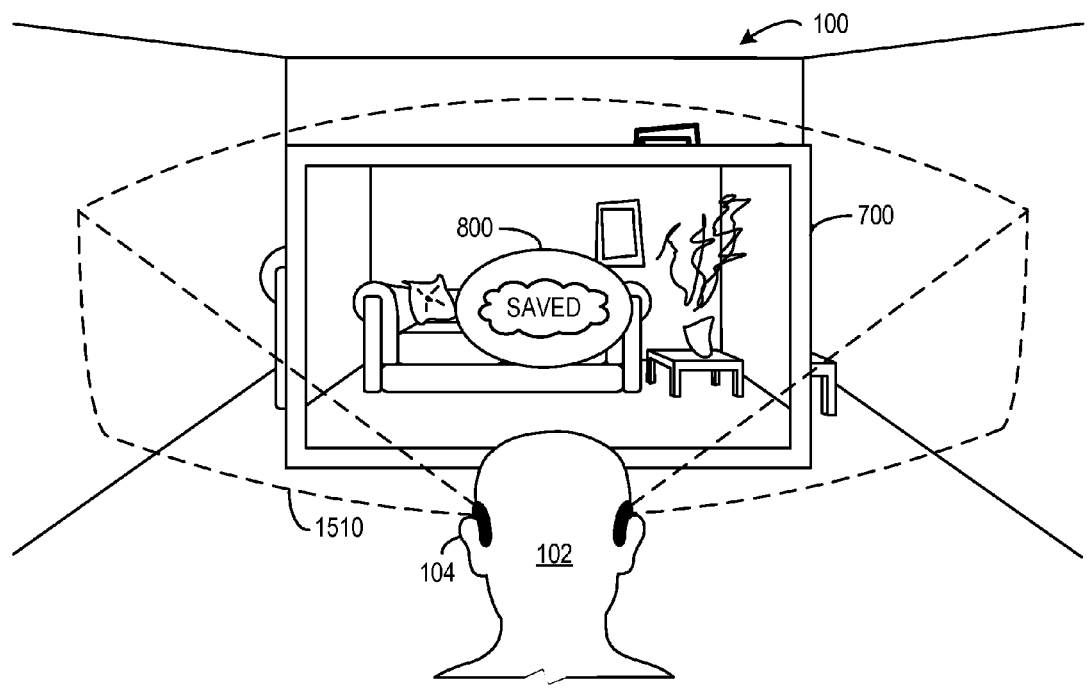
FIG. 8 shows the see-through display device of FIG. 1 visually presenting a virtual indicator that notifies the user that the mixed-reality image of FIG. 7 has been saved.

In FIG. 8, the HMD 104 visually presents a virtual indicator 800 that notifies the user 102 that the mixed-reality image 700 has been saved to the designated storage location. The virtual indicator 800 may be temporarily visually presented when the mixed-reality image is initially visually presented by the HMD 104.

Continuing with FIG. 4, in some implementations, at 324, the method 300 optionally may include determining whether the surface angle of the surface nearest the gaze vector is less than a threshold angle. The threshold angle may be set such that a surface having any angle less than the threshold angle may cause visual presentation of an image aligned in parallel with the surface to be difficult for the user to view. For example, the threshold angle may be set to 60°, 45°, 30°, 15°, or another suitable angle. If the surface angle is less than the threshold angle, then the method 300 moves to 326. Otherwise, the method 300 moves to 328.

In some implementations, at 326, the method 300 optionally may include aligning the mixed-reality image at a non-parallel angle relative to the identified surface if the surface angle is less than a threshold angle. In one example, the mixed-reality image may be aligned at an angle relative to the identified surface that causes the mixed-reality image to be oriented perpendicular relative to the perspective of the user.

Figure 9:
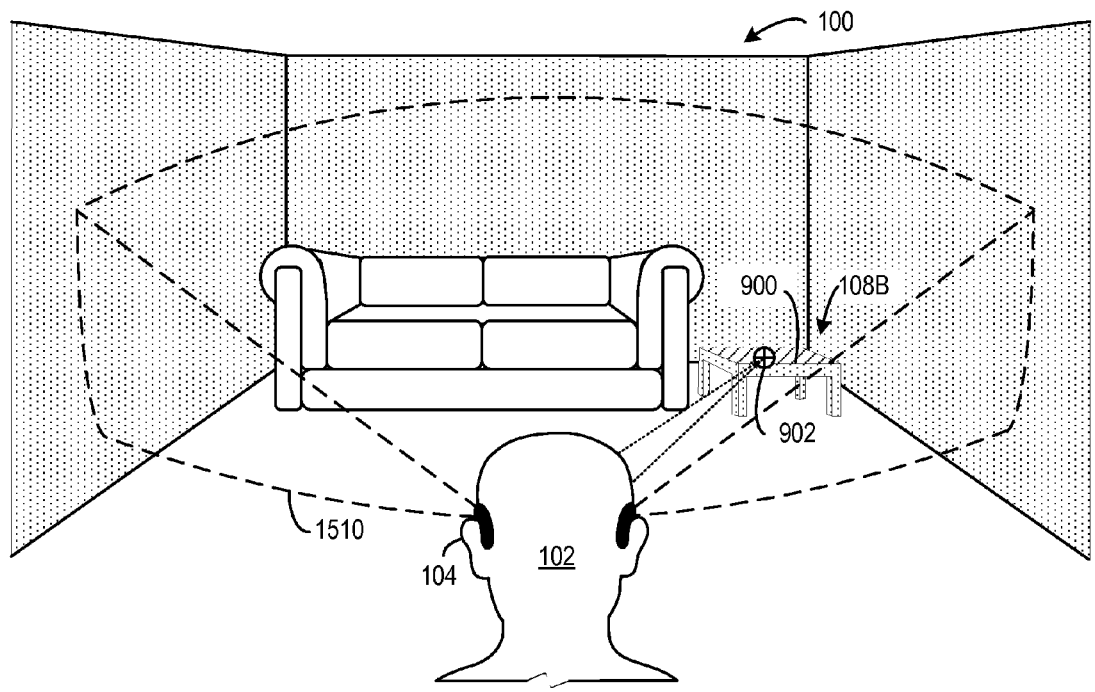
FIG. 9 shows the see-through display device of FIG. 1 identifying a surface having a surface angle that is less that a threshold angle relative to a gaze vector.
Figure 10:
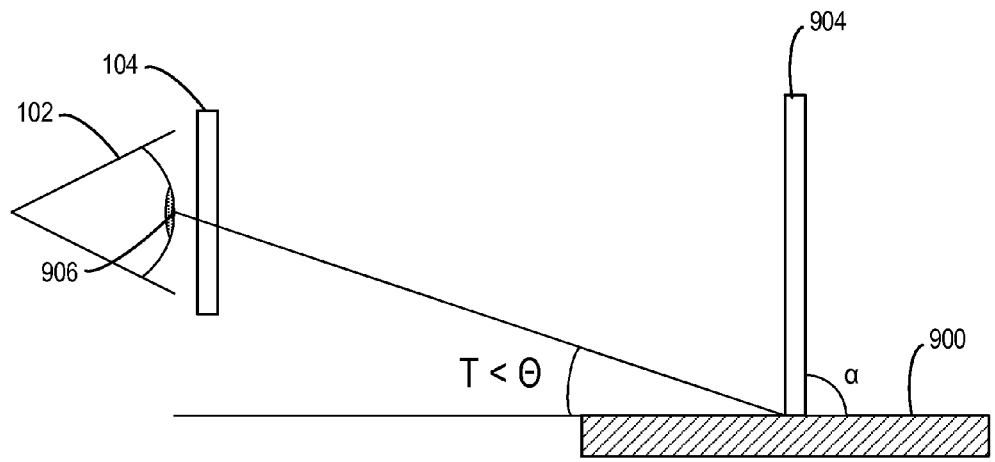
FIG. 10 shows the see-through display device of FIG. 1 visually presenting a mixed-reality image aligned at a non-parallel angle relative to the identified surface of FIG. 9.

FIGS. 9 and 10 show a scenario where a surface 900 of the real-world end table 108B is nearest a gaze vector 902 of the user 102. As such, the HMD 104 may visually present a mixed-reality image 904 in alignment with the identified surface 900. In particular, as shown in FIG. 10, a surface angle T of the surface 900 as measured relative to a perspective 906 of the user 102 may be less than a threshold angle θ. Accordingly, the HMD 104 may visually present the mixed-reality image 904 such that the mixed-reality image 904 is aligned at a non-parallel angle α relative to the identified surface 900. In this example, the angle α is 90° so that the mixed-reality image is oriented perpendicular to the surface 900. The mixed-reality image 904 may be aligned at any suitable non-parallel angle that allows the mixed-reality image 904 to be easily viewed by the user 102. Further, note that in this example the perspective 906 of the user 102 is aligned with a user eye. However, the perspective 906 of the user 102 may be set to any suitable location/pose.

Continuing with FIG. 4, in some implementations, at 328, the method 300 optionally may include aligning the mixed-reality image at a parallel angle relative to the identified surface if the surface angle is not less than the threshold angle.

In some embodiments, at 330, the method 300 optionally may include visually presenting, via the display of the augmented-reality device, an animation in which an image appears to move away from a perspective of the user of the augmented-reality device into alignment with the identified surface of the physical space.

Figure 11:
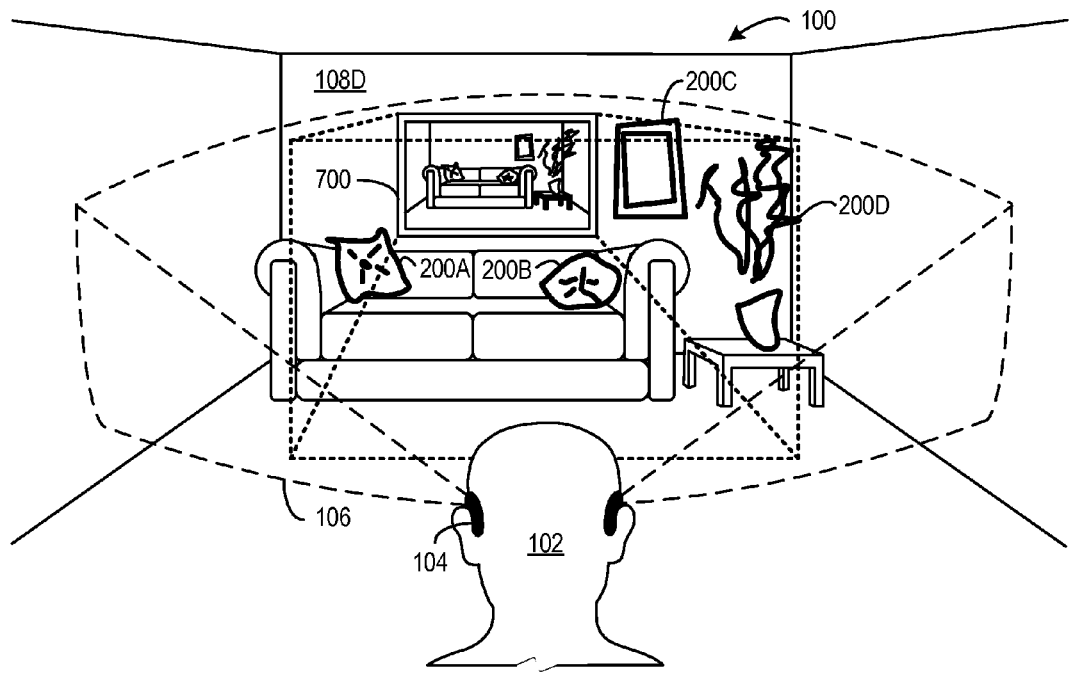
FIG. 11 shows the see-through display device of FIG. 1 visually presenting an animation of the mixed-reality image aligning with an identified surface of the physical space.

FIG. 11 continues the scenario shown in FIGS. 5-8. In particular, the HMD 104 presents an animation in which the mixed-reality image 700 appears to move away from a perspective of the user 102 into alignment with the real-world wall 108D that was identified as the surface nearest the gaze vector of the user 102. When in alignment with the real-world wall 108D, the mixed-reality image 700 may be visually presented at any suitable size. In one example, a size of the mixed-reality image 700 may be determined based on a distance between the identified surface (e.g., the real-world wall 108D) and the user 102.

In this example, the HMD 104 visually presents the mixed-reality image 700 and the plurality of augmented-reality objects 200 seemingly intermixed with the real-world objects in the physical space 100. In some examples, the HMD 104 may visually present the mixed-reality image 700 in alignment with the identified surface without visually presenting the plurality of augmented-reality objects 200.

Continuing with FIG. 4, in some implementations, at 332, the method 300 optionally may include visually presenting, via the display of the augmented-reality device, a virtual adjustment control for adjusting a size or position of the mixed-reality image in the physical space.

Figure 12:
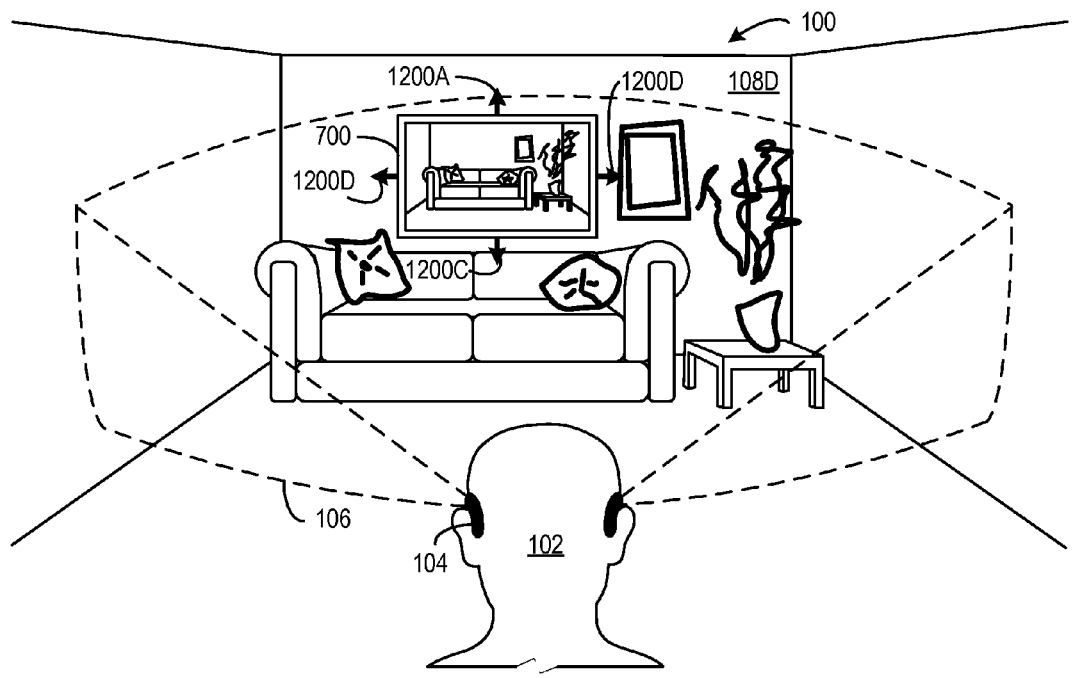
FIG. 12 shows the see-through display device of FIG. 1 visually presenting a virtual adjustment control for adjusting a size or position of the mixed-reality image in the physical space.

In FIG. 12, the HMD 104 visually presents a plurality of virtual adjustment controls 1200 (e.g., 1200A, 1200B, 1200C, 1200D). Each virtual adjustment control 1200 may be virtually manipulated by the user 102 to adjust a position of the mixed-reality image 700 in a different direction relative to the real-world wall 108D. In one example, the user 102 may virtually touch the virtual adjustment control 1200A corresponding to the "up" direction to drag the mixed-reality image 700 up the real-world wall 108D. The HMD 104 may visually present any suitable form of virtual adjustment control configured to change a size and/or position of the mixed-reality image. In some implementations, virtual controls are not displayed and gestures, voice, and/or other commands may be used to move the mixed-reality image 700.

Figure 13:
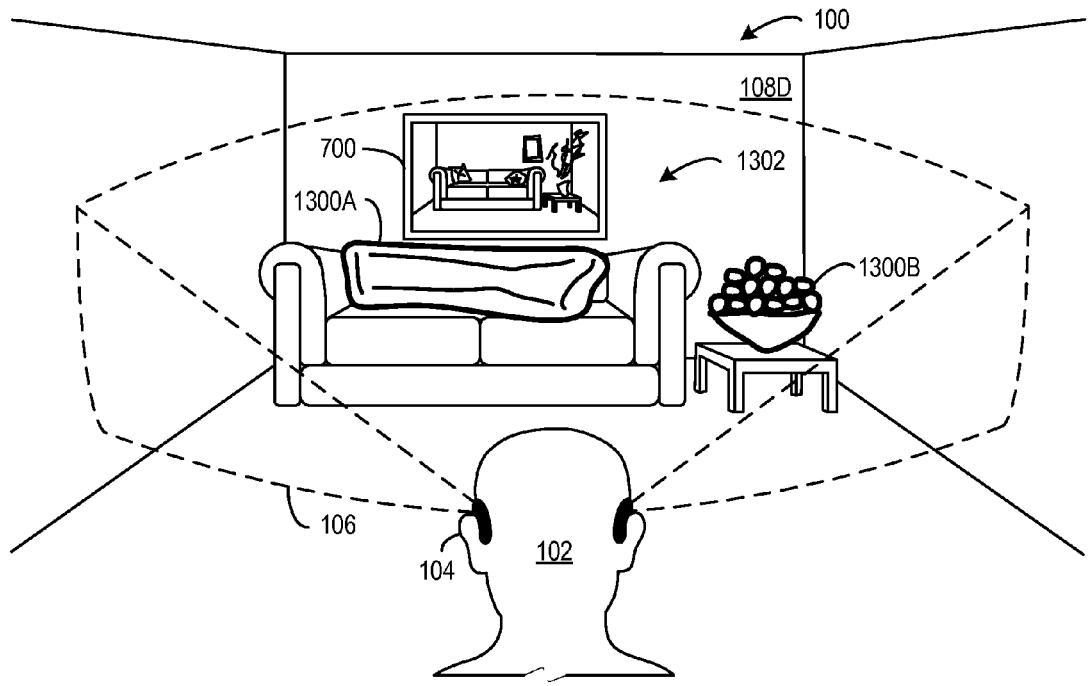
FIG. 13 shows the see-through display device of FIG. 1 visually presenting an augmentation image that augments the physical space differently than the augmentation image of FIG. 2.

In some implementations, the HMD 104 may be configured to persistently visually present a mixed-reality image, even when the physical space 100 is augmented with different augmented-reality objects. In FIG. 13, the HMD 104 visually presents the mixed-reality image 700 in alignment with the real-world wall 108D. Further, the HMD 104 visually presents a plurality of augmented-reality objects 1300 (e.g., 1300A, 1300B) seemingly intermixed with real-world objects in the physical space 100. The plurality of augmented-reality objects 1300 may collectively form an augmentation image 1302 (with or without the mixed-reality image 700). The augmentation image 1302 may differ from the augmentation image 202 of FIG. 2.

Figure 14:
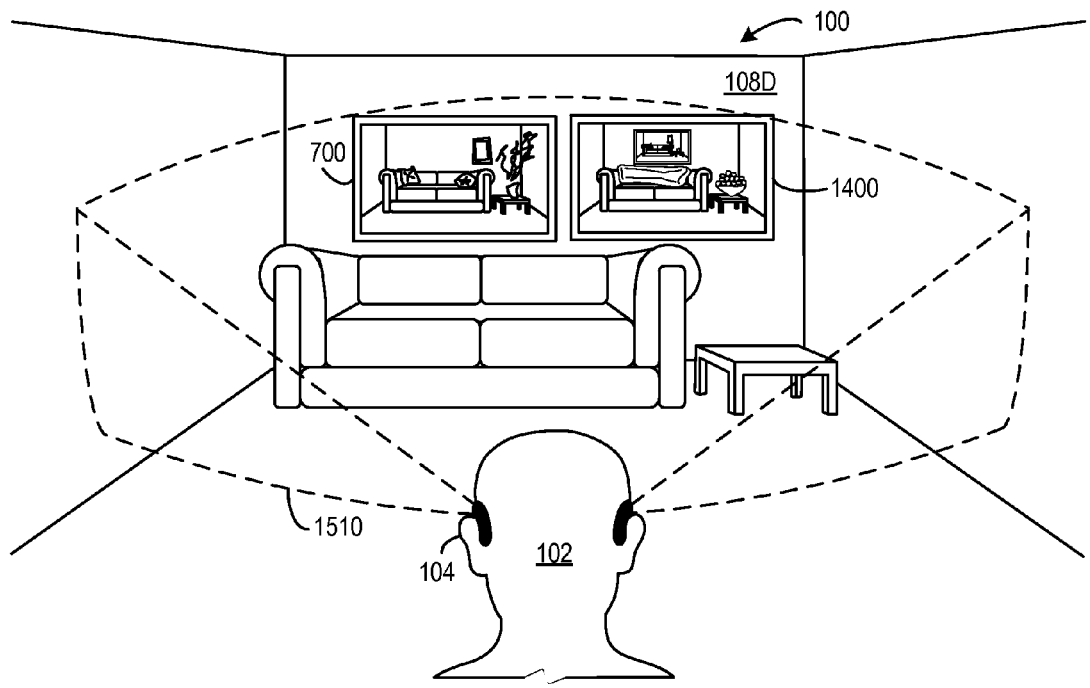
FIG. 14 shows the see-through display device of FIG. 1 simultaneously visually presenting different mixed-reality images in alignment with an identified surface of the physical space.

In FIG. 14, the HMD 104 may visually present a mixed-reality image 1400 in alignment with the real-world wall 108D and positioned alongside the mixed-reality image 700. The mixed-reality image 1400 may be composed of the augmentation image 1302 (shown in FIG. 13) overlaid on a visible-light image of the physical space 100 collected by the HMD 104. In some implementations, the mixed-reality image 700 and the plurality of augmented-reality objects 1300 may be in different layers or different augmentation images that may allow for selective inclusion in the mixed-reality image 1400. In other words, the mixed-reality image 700 may not be represented in the mixed-reality image 1400.

In the illustrated example, the HMD 104 visually presents the mixed-reality image 700 and the mixed-reality image 1400 without visually presenting the plurality of augmented-reality objects 1300 (shown in FIG. 13). In other examples, the HMD 104 may visually present the plurality of augmented-reality objects 1300 and the mixed-reality images 700 and 1400. In general, mixed-reality images may be displayed with or without the augmentations that existed when the visible light image was capture.

Figure 15:
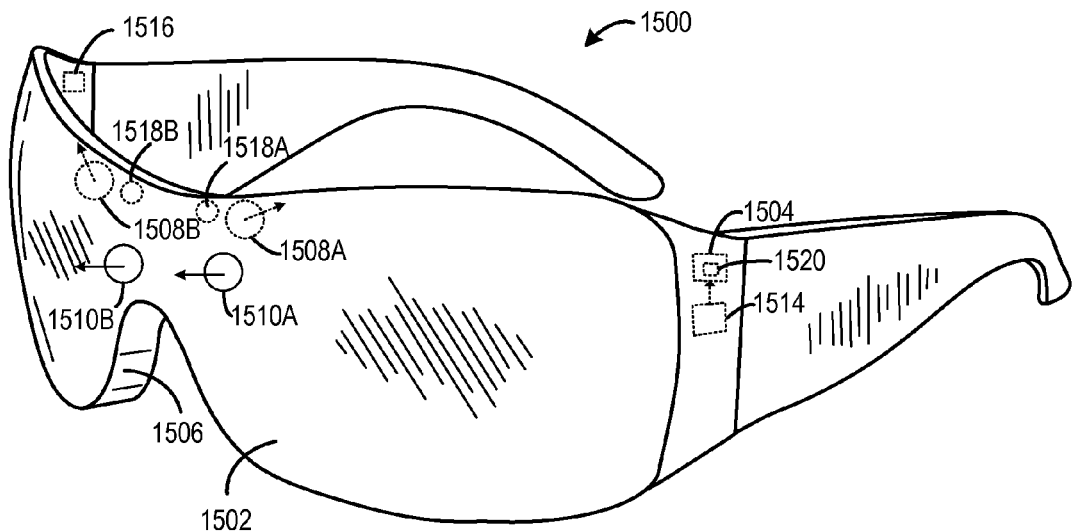
FIG. 15 shows an example head-mounted, see-through display device.

FIG. 15 shows a non-limiting example of a head-mounted, near-eye, see-through display system, also referred to as an HMD 1500, in the form of wearable glasses with a see-through display 1502. For example, the HMD 1500 may be a non-limiting example of the HMD 104 of FIG. 1, and/or the computing system 1600 of FIG. 16. An HMD may take any other suitable form in which a transparent, semi-transparent, and/or non-transparent display is supported in front of a viewer's eye or eyes. Further, implementations described herein may be used with any other suitable computing device, including but not limited to mobile computing devices, laptop computers, desktop computers, tablet computers, other wearable computers, etc. For example, an augmented-reality image may be displayed on a mobile phone's display along with real world imagery captured by the mobile phone's camera.

The HMD 1500 includes a see-through display 1502 and a controller 1504. The controller 1504 may include an augmented-reality engine 1520 configured to perform various operations related to visual presentation of augmented-reality and mixed-reality image on the see-through display 1502.

The see-through display 1502 may enable images such as augmented-reality images (also referred to as holograms or augmented-reality objects) to be delivered to the eyes of a wearer of the HMD. The see-through display 1502 may be configured to visually augment an appearance of a real-world, physical environment to a wearer viewing the physical environment through the see-through display 1502. In one example, the see-through display 1502 may be configured to display one or more UI objects of a graphical user interface. In some implementations, the UI objects presented on the graphical user interface may be virtual objects seemingly intermixed with the real-world environment. Likewise, in some implementations, the UI objects presented on the graphical user interface may incorporate elements of real-world objects of the real-world environment seen through the see-through display 1502. In other examples, the display may be configured to display one or more other graphical objects, such as virtual objects associated with games, videos, or other visual content.

Any suitable mechanism may be used to display images via the see-through display 1502. For example, the see-through display 1502 may include image-producing elements located within lenses 1506 (such as, for example, a see-through Organic Light-Emitting Diode (OLED) display). As another example, the see-through display 1502 may include a display device (such as, for example a liquid crystal on silicon (LCOS) device or OLED microdisplay) located within a frame of HMD 1500. In this example, the lenses 1506 may serve as, or otherwise include, a light guide for delivering light from the display device to the eyes of a wearer. Such a light guide may enable a wearer to perceive a 3D holographic image located within the physical environment that the wearer is viewing, while also allowing the wearer to directly view physical objects in the physical environment, thus creating a mixed-reality environment. Additionally or alternatively, the see-through display 1502 may present left-eye and right-eye augmented-reality images via respective left-eye and right-eye displays.

The HMD 1500 may also include various sensors and related systems to provide information to the controller 1504. Such sensors may include, but are not limited to, one or more inward facing image sensors 1508A and 1508B, one or more outward facing image sensors 1510A and 1510B, an inertial measurement unit (IMU) 1514, and one or more microphones 1516. The one or more inward facing image sensors 1508A, 1508B may be configured to acquire image data in the form of gaze tracking data from a wearer's eyes (e.g., sensor 1508A may acquire image data for one of the wearer's eye and sensor 1508B may acquire image data for the other of the wearer's eye).

The augmented-reality engine 1520 of the HMD 1500 may be configured to determine gaze directions of each of a wearer's eyes in any suitable manner based on the information received from the image sensors 1508A, 1508B. For example, one or more light sources 1518A, 1518B, such as infrared light sources, may be configured to cause a glint of light to reflect from the cornea of each eye of a wearer. The one or more image sensors 1508A, 1508B may then be configured to capture an image of the wearer's eyes. Images of the glints and of the pupils as determined from image data gathered from the image sensors 1508A, 1508B may be used by the augmented-reality engine 1520 to determine an optical axis of each eye. Using this information, the augmented-reality engine 1520 may be configured to determine a direction the wearer is gazing (also referred to as a gaze vector). The augmented-reality engine 1520 may be configured to additionally determine an identity of a physical and/or virtual object at which the wearer is gazing by projecting the user's gaze vector onto a 3D model of the surrounding environment. The one or more light sources 1518A, 1518B and the one or more inward facing image sensors 1508a, 1508B may collectively represent to a gaze sensor configured to measure one or more gaze parameters of the user's eyes. In other implementations, a different type of gaze sensor may be employed in the HMD 1500 to measure one or more gaze parameters of the user's eyes. Examples of gaze parameters measured by one or more gaze sensors that may be used by the augmented-reality engine 1520 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes of the wearer of the HMD 1500.

The one or more outward facing image sensors 1510A, 1510B may be configured to measure physical environment attributes of the physical environment in which the HMD 1500 is located (e.g., light intensity). In one example, image sensor 1510A may include a visible-light camera configured to collect a visible-light image of a physical space. Further, the image sensor 1510B may include a depth camera configured to collect a depth image of a physical space. More particularly, in one example, the depth camera is an infrared time-of-flight depth camera. In another example, the depth camera is an infrared structured light depth camera.

Data from the outward facing image sensors 1510A, 1510B may be used by the augmented-reality engine 1520 to detect movements within a field of view of the see-through display 1502, such as gesture-based inputs or other movements performed by a wearer or by a person or physical object within the field of view. In one example, data from the outward facing image sensors 1510A, 1510B may be used to detect a selection input performed by the wearer of the HMD, such as a gesture (e.g., a pinching of fingers, closing of a fist, etc.), that indicates selection of a UI object displayed on the display device. Data from the outward facing image sensors 1510A, 1510B may be used by the augmented-reality engine 1520 to determine direction/location and orientation data (e.g., from imaging environmental features) that enables position/motion tracking of the HMD 1500 in the real-world environment. Data from the outward facing image sensors 1510A, 1510B may be used by the augmented-reality engine 1520 to construct still images and/or video images of the surrounding environment from the perspective of the HMD 1500.

Data from the outward facing image sensors 1510A, 1510B may be used by the augmented-reality engine 1520 to identify surfaces of a physical space. As such, the outward facing image sensors 1510A, 1510B may be referred to as surface sensors configured to measure one or more surface parameters of the physical space.

The augmented-reality engine 1520 may be configured to identify surfaces of the physical space in any suitable manner. In one example, surfaces of the physical space may be identified based on depth maps derived from depth data provide by the depth camera 1510B. In another example, the augmented-reality engine 1520 may be configured to generate or update a three-dimensional model of the physical using information from outward facing image sensors 1510A, 1510B. Additionally or alternatively, information from outward facing image sensors 1510A, 151B may be communicated to a remote computer responsible for generating and/or updating a model of the physical space. In either case, the relative position and/or orientation of the HMD 1500 relative to the physical space may be assessed so that augmented-reality images may be accurately displayed in desired real-world locations with desired orientations. In one example, the augmented-reality engine may be configured to perform simultaneous localization and mapping (SLAM) of a physical space using information provided by a surface sensor, alone or in combination with other sensors of the HMD 1500. In particular, the augmented-reality engine 1520 may be configured to generate a 3D model of the physical space including surface reconstruction information that may be used to identify surfaces in the physical space.

In some implementations, the HMD 1500 may include different surface sensors configured to measure one or more surface parameters of the physical space.

The IMU 1514 may be configured to provide position and/or orientation data of the HMD 1500 to the controller 1504. In one implementation, the IMU 1514 may be configured as a three-axis or three-degree of freedom (3DOF) position sensor system. This example position sensor system may, for example, include three gyroscopes to indicate or measure a change in orientation of the HMD 1500 within 3D space about three orthogonal axes (e.g., roll, pitch, and yaw). The orientation derived from the sensor signals of the IMU may be used to display, via the see-through display, one or more AR images with a realistic and stable position and orientation.

In another example, the IMU 1514 may be configured as a six-axis or six-degree of freedom (6DOF) position sensor system. Such a configuration may include three accelerometers and three gyroscopes to indicate or measure a change in location of the HMD 1500 along three orthogonal spatial axes (e.g., x, y, and z) and a change in device orientation about three orthogonal rotation axes (e.g., yaw, pitch, and roll). In some implementations, position and orientation data from the outward facing image sensors 1510A, 1510B and the IMU 1514 may be used in conjunction to determine a position and orientation (or 6DOF pose) of the HMD 1500.

The HMD 1500 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

Figure 16:
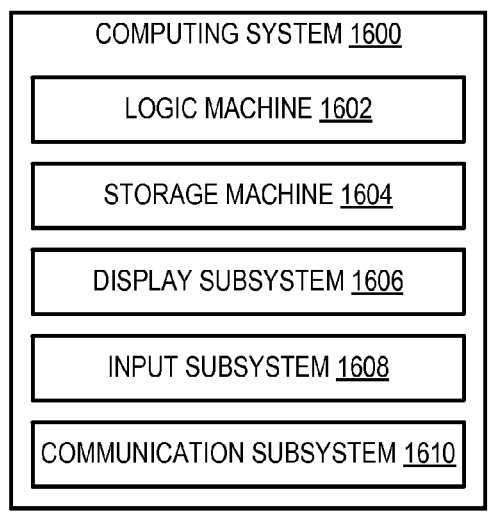
FIG. 16 shows an example computing system.

The controller 1504 may include a logic machine and a storage machine, discussed in more detail above with respect to FIG. 16, in communication with the display and the various sensors of the HMD 1500.

In some implementations, the methods and processes described herein may be tied to a computing system of one or more computing devices. In particular, such methods and processes may be implemented as a computer-application program or service, an application-programming interface (API), a library, and/or other computer-program product.

FIG. 16 schematically shows a non-limiting implementation of a computing system 1600 that can enact one or more of the methods and processes described above. Computing system 1600 is shown in simplified form. Computing system 1600 may take the form of one or more personal computers, server computers, tablet computers, home-entertainment computers, network computing devices, gaming devices, mobile computing devices, mobile communication devices (e.g., smart phone), augmented-reality devices, HMDs, and/or other computing devices. For example, the computing system 1600 may be a non-limiting example of the HMD 104 of FIG. 1, and/or the HMD 1500 of FIG. 15.

Computing system 1600 includes a logic machine 1602 and a storage machine 1604. Computing system 1600 may optionally include a display subsystem 1606, input subsystem 1608, communication subsystem 1610, and/or other components not shown in FIG. 16.

Logic machine 1602 includes one or more physical devices configured to execute instructions. For example, the logic machine 1602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1602 may include one or more processors configured to execute software instructions. Additionally or alternatively, the logic machine 1602 may include one or more hardware or firmware logic machines configured to execute hardware or firmware instructions. Processors of the logic machine 1602 may be single-core or multi-core, and the instructions executed thereon may be configured for sequential, parallel, and/or distributed processing. Individual components of the logic machine 1602 optionally may be distributed among two or more separate devices, which may be remotely located and/or configured for coordinated processing. Aspects of the logic machine 1602 may be virtualized and executed by remotely accessible, networked computing devices configured in a cloud-computing configuration.

Storage machine 1604 includes one or more physical devices configured to hold instructions executable by the logic machine 1602 to implement the methods and processes described herein. When such methods and processes are implemented, the state of storage machine 1604 may be transformed—e.g., to hold different data.

Storage machine 1604 may include removable and/or built-in devices. Storage machine 1604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1604 may include volatile, nonvolatile, dynamic, static, read/write, read-only, random-access, sequential-access, location-addressable, file-addressable, and/or content-addressable devices.

It will be appreciated that storage machine 1604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1602 and storage machine 1604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "engine" may be used to describe an aspect of computing system 1600 implemented to perform a particular function. In some cases, an engine may be instantiated via logic machine 1602 executing instructions held by storage machine 1604. It will be understood that different engines may be instantiated from the same application, service, code block, object, library, routine, API, function, etc. Likewise, the same module, program, and/or engine may be instantiated by different applications, services, code blocks, objects, routines, APIs, functions, etc. The term "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1606 may be used to present a visual representation of data held by storage machine 1604. This visual representation may take the form of a graphical user interface (GUI). As the herein described methods and processes change the data held by the storage machine, and thus transform the state of the storage machine, the state of display subsystem 1606 may likewise be transformed to visually represent changes in the underlying data. Display subsystem 1606 may include one or more display devices utilizing virtually any type of technology. Such display devices may be combined with logic machine 1602 and/or storage machine 1604 in a shared enclosure, or such display devices may be peripheral display devices.

When included, input subsystem 1608 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1610 may be configured to communicatively couple computing system 1600 with one or more other computing devices. Communication subsystem 1610 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 1600 to send and/or receive messages to and/or from other devices via a network such as the Internet.

In another example implementation, a head-mounted display device comprises a visible-light camera configured to collect a visible-light image of a physical space, a surface sensor configured to measure one or more surface parameters of the physical space, a see-through display configured to visually present an augmentation image while light from the physical space passes through the see-through display to a user eye, and an augmented-reality engine. The augmented-reality engine may be configured to identify a surface of the physical space from the one or more measured surface parameters, compose a mixed-reality image that includes the augmentation image overlaid on the visible-light image, and visually present, via the see-through display, the mixed-reality image in alignment with the identified surface. In one example implementation that optionally may be combined with any of the features described herein, the head-mounted display device further comprises a gaze sensor configured to measure one or more gaze parameters. The augmented-reality engine may be configured to recognize a gaze vector from the one or more gaze parameters, and wherein the identified surface is a surface nearest the gaze vector. In one example implementation that optionally may be combined with any of the features described herein, the surface sensor is a depth camera, and the one or more surface parameters include a relative surface depth measured by the depth camera. In one example implementation that optionally may be combined with any of the features described herein, the mixed-reality image is aligned at an angle that is parallel with the identified surface. In one example implementation that optionally may be combined with any of the features described herein, the augmented-reality engine is configured to determine an angle of the identified surface relative to a perspective of a user of the head-mounted display device, and align the mixed-reality image at a non-parallel angle relative to the identified surface if the angle is less than a threshold angle. In one example implementation that optionally may be combined with any of the features described herein, the mixed-reality image is automatically visually presented via the see-through display responsive to a user request during use of the head-mounted display device. In one example implementation that optionally may be combined with any of the features described herein, the mixed-reality image is automatically visually presented via the see-through display responsive to the visible-light camera collecting the visible light image. In one example implementation that optionally may be combined with any of the features described herein, the see-through display is configured to visually present an animation in which the mixed-reality image appears to move away from the user eye into alignment with the identified surface of the physical space. In one example implementation that optionally may be combined with any of the features described herein, the augmented-reality engine is configured to visually present, via the see-through display, a virtual adjustment control for adjusting a size or position of the mixed-reality image in the physical space.

In another example implementation, a method for controlling an augmented-reality device, comprises collecting, with a visible-light camera of the augmented-reality device, a visible-light image of a physical space, measuring, with a surface sensor of the augmented-reality device, one or more surface parameters of the physical space, identifying a surface of the physical space from the one or more measured surface parameters, and visually presenting, via a display of the augmented-reality device, the visible-light image in alignment with the identified surface from a perspective of a user of the augmented-reality device. In one example implementation that optionally may be combined with any of the features described herein, the method further comprises visually presenting, via the display of the augmented-reality device, one or more virtual objects overlaid on the physical space, composing a mixed-reality image that includes the one or more virtual objects overlaid on the visible-light image of the physical space, and visually presenting, via the display of the augmented-reality device, the mixed-reality image in alignment with the identified surface from the perspective of the user of the augmented-reality device. In one example implementation that optionally may be combined with any of the features described herein, the method further comprises measuring, with a gaze sensor of the augmented-reality device, one or more gaze parameters of a user eye, and recognizing a gaze vector of the user eye from the one or more gaze parameters, and wherein the identified surface is a surface nearest the gaze vector. In one example implementation that optionally may be combined with any of the features described herein, the visible-light image is aligned at an angle that is parallel with the identified surface. In one example implementation that optionally may be combined with any of the features described herein, the method further comprises determining an angle of the identified surface relative to a perspective of a user of the augmented-reality device, and aligning the mixed-reality image at a non-parallel angle relative to the identified surface if the angle is less than a threshold angle. In one example implementation that optionally may be combined with any of the features described herein, the visible-light image is automatically visually presented via the display responsive to the visible-light camera collecting the visible light image. In one example implementation that optionally may be combined with any of the features described herein, the method further comprises visually presenting, via the display of the augmented-reality device, an animation in which the visible-light image appears to move away from a perspective of the user of the augmented-reality device into alignment with the identified surface of the physical space.

In another example implementation, a method for controlling an augmented-reality device comprises measuring, with a surface sensor of the augmented-reality device, one or more surface parameters of a physical space, identifying one or more surfaces of the physical space from the one or more measured surface parameters, visually presenting, via a see-through display of the augmented-reality device, an augmentation image while light from the physical space passes through the see-through display to a user eye, collecting, with a visible-light camera of the augmented-reality device, a visible-light image of the physical space, composing a mixed-reality image that includes the augmentation image overlaid on the visible-light image, measuring, with a gaze sensor of the augmented-reality device, one or more gaze parameters of a user eye, recognizing a gaze vector from the one or more gaze parameters, and automatically visually presenting, via the see-through display of the augmented-reality device, the mixed-reality image in alignment with an identified surface nearest the gaze vector. In one example implementation that optionally may be combined with any of the features described herein, the mixed-reality image is automatically visually presented via the see-through display responsive to the visible-light camera collecting the visible light image. In one example implementation that optionally may be combined with any of the features described herein, the method further comprises visually presenting, via the see-through display of the augmented-reality device, an animation in which the mixed-reality image appears to move away from a perspective of the user of the augmented-reality device into alignment with the identified surface of the physical space. In one example implementation that optionally may be combined with any of the features described herein, the method further comprises determining an angle of the identified surface relative to a perspective of the user eye, and aligning the mixed-reality image at a non-parallel angle relative to the identified surface if the angle is less than a threshold angle.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display device comprising:
a visible-light camera configured to collect a visible-light image of a physical space;
a surface sensor configured to measure one or more surface parameters of the physical space;
a see-through display configured to visually present an augmentation image while light from the physical space passes through the see-through display to a user eye; and
an augmented-reality engine configured to:
identify a surface of the physical space from the one or more measured surface parameters,
determine an angle of the identified surface relative to a perspective of the see-through display;
compose a mixed-reality image that includes the augmentation image overlaid on the visible-light image, and
visually present, via the see-through display, the mixed-reality image in alignment with the identified surface at a non-parallel angle relative to the identified surface if the angle is less than a threshold angle.

2. The head-mounted display device of claim 1, further comprising:
a gaze sensor configured to measure one or more gaze parameters; and
wherein the augmented-reality engine is configured to recognize a gaze vector from the one or more gaze parameters, and wherein the identified surface is a surface nearest the gaze vector.

3. The head-mounted display device of claim 1, wherein the surface sensor is a depth camera, and wherein the one or more surface parameters include a relative surface depth measured by the depth camera.

4. The head-mounted display device of claim 1, wherein the mixed-reality image is aligned at an angle that is parallel with the identified surface.

5. The head-mounted display device of claim 1, wherein the mixed-reality image is automatically visually presented via the see-through display responsive to a user request during use of the head-mounted display device.

6. The head-mounted display device of claim 1, wherein the mixed-reality image is automatically visually presented via the see-through display responsive to the visible-light camera collecting the visible light image.

7. The head-mounted display device of claim 1, wherein the see-through display is configured to visually present an animation in which the mixed-reality image appears to move away from the user eye into alignment with the identified surface of the physical space.

8. The head-mounted display device of claim 1, wherein the augmented-reality engine is configured to visually present, via the see-through display, a virtual adjustment control for adjusting a size or position of the mixed-reality image in the physical space.

9. A method for controlling an augmented-reality device, comprising:
collecting, with a visible-light camera of the augmented-reality device, a visible-light image of a physical space;
measuring, with a surface sensor of the augmented-reality device, one or more surface parameters of the physical space;
identifying a surface of the physical space from the one or more measured surface parameters;
determining an angle of the identified surface relative to a perspective of a user of the augmented-reality device; and
visually presenting, via a display of the augmented-reality device, the visible-light image in alignment with the identified surface at a non-parallel angle relative to the identified surface if the angle is less than a threshold angle from a perspective of a user of the augmented-reality device.

10. The method of claim 9, further comprising
visually presenting, via the display of the augmented-reality device, one or more virtual objects overlaid on the physical space;
composing a mixed-reality image that includes the one or more virtual objects overlaid on the visible-light image of the physical space; and
visually presenting, via the display of the augmented-reality device, the mixed-reality image in alignment with the identified surface from the perspective of the user of the augmented-reality device.

11. The method of claim 9, further comprising:
measuring, with a gaze sensor of the augmented-reality device, one or more gaze parameters of a user eye; and
recognizing a gaze vector of the user eye from the one or more gaze parameters, and wherein the identified surface is a surface nearest the gaze vector.

12. The method of claim 9, wherein the visible-light image is aligned at an angle that is parallel with the identified surface.

13. The method of claim 9, wherein the visible-light image is automatically visually presented via the display responsive to the visible-light camera collecting the visible light image.

14. The method of claim 9, further comprising:
visually presenting, via the display of the augmented-reality device, an animation in which the visible-light image appears to move away from a perspective of the user of the augmented-reality device into alignment with the identified surface of the physical space.

15. A method for controlling an augmented-reality device, comprising:
measuring, with a surface sensor of the augmented-reality device, one or more surface parameters of a physical space;
identifying one or more surfaces of the physical space from the one or more measured surface parameters;
visually presenting, via a see-through display of the augmented-reality device, an augmentation image while light from the physical space passes through the see-through display to a user eye;
collecting, with a visible-light camera of the augmented-reality device, a visible-light image of the physical space;
composing a mixed-reality image that includes the augmentation image overlaid on the visible-light image;
measuring, with a gaze sensor of the augmented-reality device, one or more gaze parameters of a user eye;
recognizing a gaze vector from the one or more gaze parameters;
determining an angle of the identified surface relative to a perspective of the user eye; and
automatically visually presenting, via the see-through display of the augmented-reality device, the mixed-reality image in alignment with an identified surface nearest the gaze vector at a non-parallel angle relative to the identified surface if the angle is less than a threshold angle.

16. The method of claim 15, wherein the mixed-reality image is automatically visually presented via the see-through display responsive to the visible-light camera collecting the visible light image.

17. The method of claim 15, further comprising:
visually presenting, via the see-through display of the augmented-reality device, an animation in which the mixed-reality image appears to move away from a perspective of the user of the augmented-reality device into alignment with the identified surface of the physical space.

* * * * *